Dec. 12, 1933.     W. F. GERHARDT ET AL     1,939,047
AERODYNAMIC INSTRUCTION AND TESTING APPARATUS
Filed Dec. 13, 1929     5 Sheets-Sheet 3

INVENTORS
WILLIAM F. GERHARDT and CLARENCE A. BROCK
BY
ATTORNEY

Dec. 12, 1933.　　W. F. GERHARDT ET AL　　1,939,047
AERODYNAMIC INSTRUCTION AND TESTING APPARATUS
Filed Dec. 13, 1929　　5 Sheets-Sheet 4

INVENTORS
WILLIAM F. GERHARDT and CLARENCE A. BROCK
BY
ATTORNEY

Dec. 12, 1933.  W. F. GERHARDT ET AL  1,939,047
AERODYNAMIC INSTRUCTION AND TESTING APPARATUS
Filed Dec. 13, 1929   5 Sheets-Sheet 5
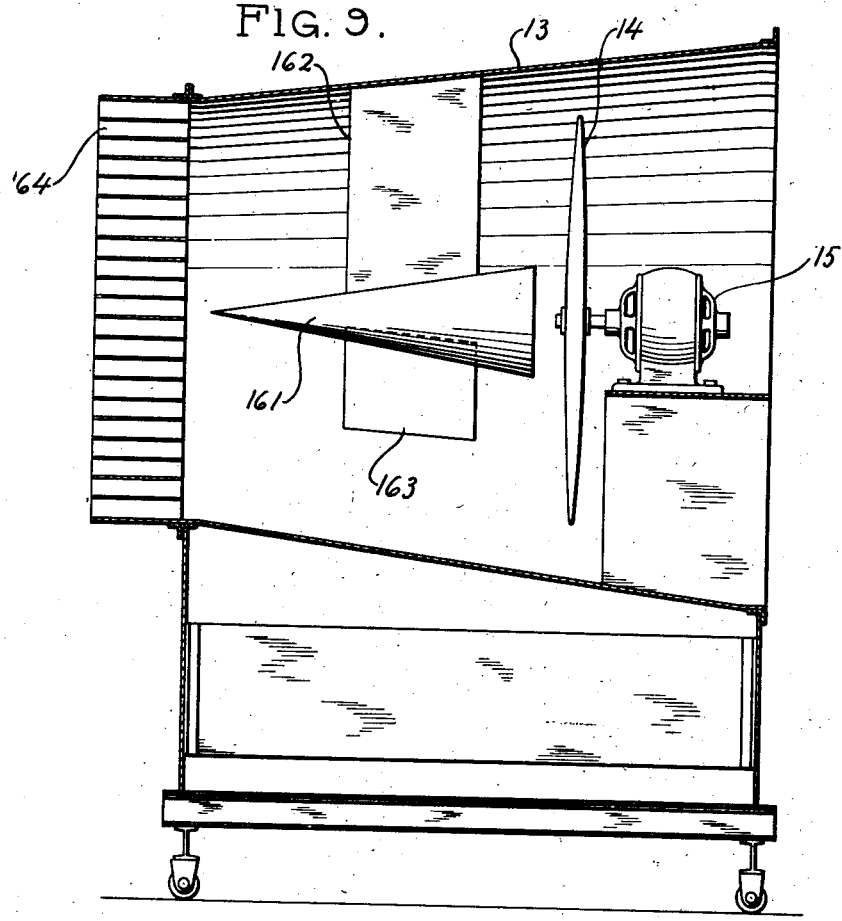
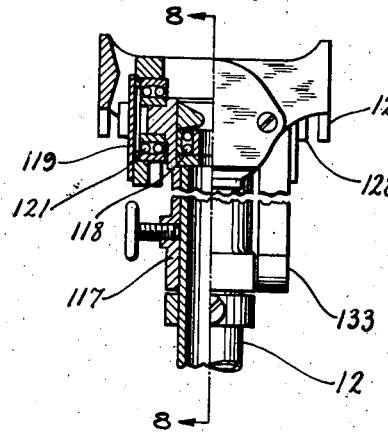
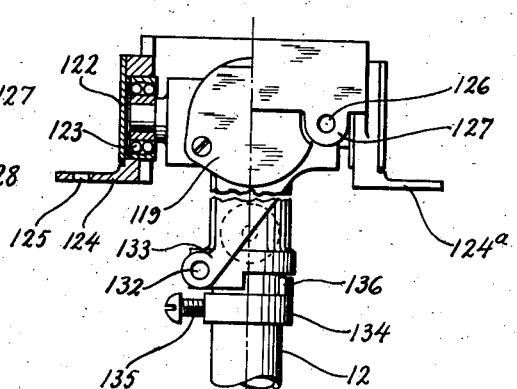
INVENTORS
WILLIAM F. GERHARDT and CLARENCE A. BROCK
BY
ATTORNEY Patented Dec. 12, 1933

1,939,047

UNITED STATES PATENT OFFICE 1,939,047

AERODYNAMIC INSTRUCTION AND TESTING APPARATUS

William F. Gerhardt, Grosse Ile, and Clarence A. Brock, Detroit, Mich., assignors, by mesne assignments, to Curtiss-Wright Flying Service, Inc., a corporation of Delaware Application December 13, 1929
Serial No. 413,747

21 Claims. (Cl. 35—12)

This invention relates generally to aeronautics and especially to apparatus for instructing in aeronautical theory and practice and for testing different types of aircraft. More specifically it relates to a novel type of combined wind tunnel and model airplane.

Prior to our invention wind tunnels have been used for measuring the forces upon the various parts of aircraft and for developing and testing aerodynamic theory. Full size airplanes have been used for training prospective pilots in the handling of controls, and have, of course, been used for the testing of aerodynamic theory. However, in the use of wind tunnels prior to our invention, the model has usually been placed within the tunnel and not in unrestricted view. Moreover, the models have usually been fixed against any substantial vertical movement and against any substantial rotation about their various axes. Furthermore, there has usually been no way of moving the controls while the model was being tested in the tunnel and thus no way of observing the effect of movement of the controls at the time of the movement. Experiments with full size aircraft for testing theory and the use of full size aircraft in the teaching of handling of the controls are relatively expensive and dangerous.

One of the objects of our invention is to provide new apparatus for teaching aerodynamic theory, so that ground instruction in aviation principles may be made easier and more scientific. For example, among other desirable features included in this general object is the teaching of the effect of the dihedral angle upon the lateral balance of an airplane, which teaching may be aided by making the dihedral angle of the model airplane adjustable. Thus the horizontal equivalent theory of the dihedral angle may be disproved and the true theory demonstrated. A further specific feature of our invention which aids in accomplishing the general object stated above is that of providing means for selectively locking the model airplane against movement about any one of its three principal axes or against movement in a vertical direction while maintaining its action free in other respects or similarly for locking it against more than one or all of these movements.

A further object of our invention is the provision of novel apparatus for teaching the control of airplanes. For example, we may, by the use of our improved apparatus give ground instruction in flying in which the controls may be handled in the same manner as they would be in a full sized airplane flying through the air and act in the same way upon the operation of the model airplane so that the model airplane becomes capable of taking off, landing, flying in stable equilibrium, stalling, indicating a spin and indicating a ground loop. Moreover, wind resistance on the controls is simulated, and the operator feels the air blast upon his face as he would in flying an open cockpit airplane.

A further object of our invention is the provision of novel apparatus for testing aircraft. More specifically under this general object, we desire to provide a model airplane which is capable of free movement vertically and about its three principal axes so that the conditions of actual flight are more nearly approximated than they are in wind tunnel testing where the airplane is not so free for movement. It is desirable in this way to test the controlability and stability of various types of aircraft.

A further object of our invention is to provide a novel publicity device.

A further specific object of our invention is to provide an apparatus by which full size controls may be used to operate a small model airplane in full view of the operator and by which the behavior of the airplane consequent upon movements of the controls can be accurately and immediately determined.

A further object of our invention is to provide novel means for controlling the air flow through a wind tunnel and preventing formation of eddies in the air stream issuing from the tunnel.

A further object of our invention is the provision of means for controlling the speed of the stream of air flowing through and out of a wind tunnel.

Further objects of our invention will be apparent from a reading of the subjoined specification and claims and from a consideration of the drawings.

In order to explain the invention more clearly, we have shown one embodiment thereof in the attached drawings, in which:

Fig. 7 is an elevation of the universal mounting of the model airplane shown with parts broken away and parts in section, the view being taken at right angles to Fig. 1;

Fig. 8 is an elevation of the mounting shown in Fig. 7 taken at right angles thereto with parts broken away and parts shown in section on the line 8—8 of Fig. 7; and Fig. 9 is a sectional view of the wind tunnel shown in Fig. 1.

Figure 1:
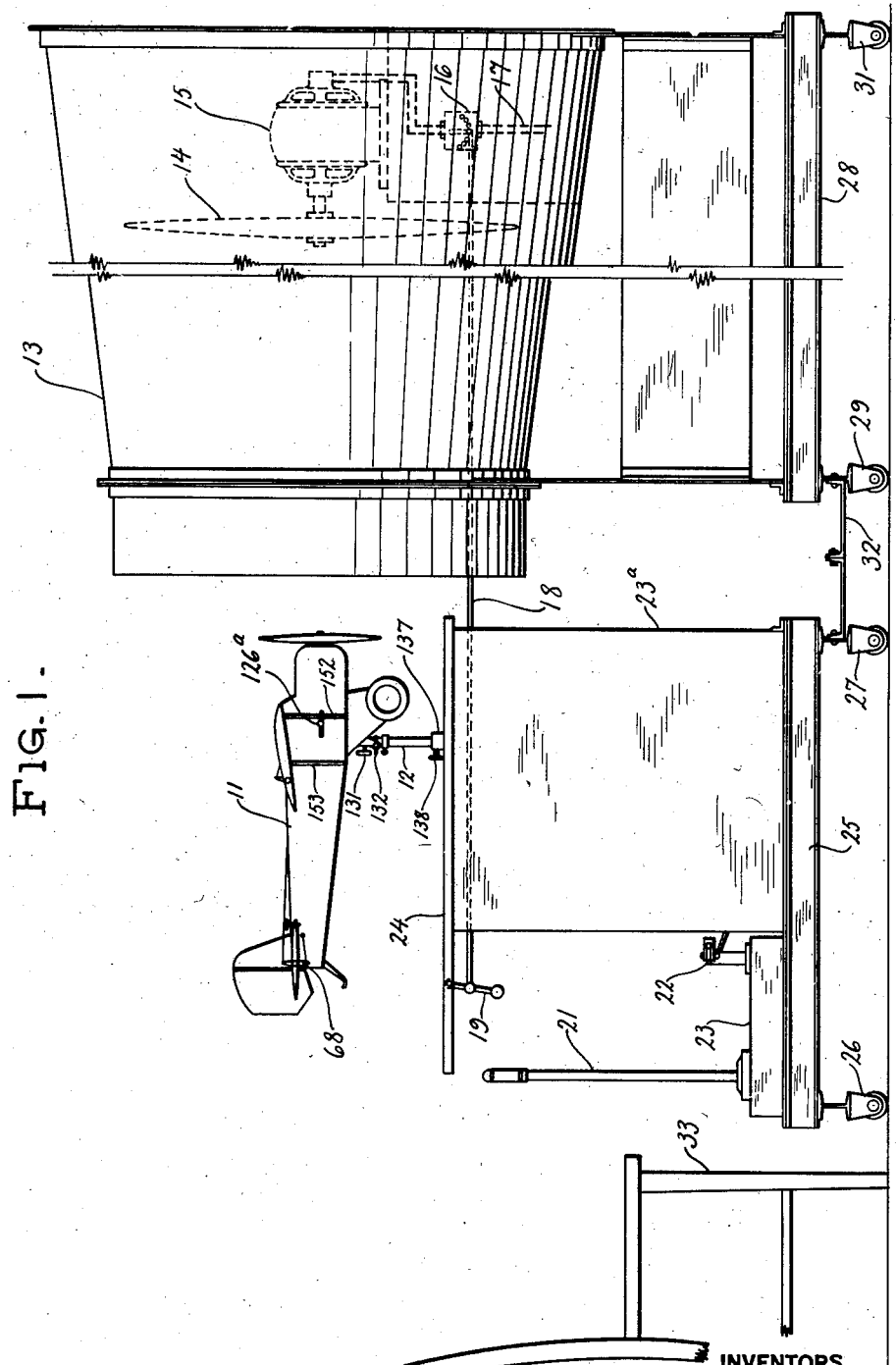
Fig. 1 is a view in side elevation of the complete device, with parts broken away and with some of the hidden parts shown in dotted lines.

In general, the apparatus used for illustration of our invention comprises a model airplane mounted on the top of a "mast" adjacent to a small wind tunnel. The plane is restrained against all lateral motion and also against all except a very limited fore and aft motion by being fastened to the top of the mast. But the mast itself, and therefore also the airplane, is free to rise and fall substantially vertically. The mast is continually maintained vertical by reason of its mounting in a parallelogram system and counter weights are provided for substantially balancing the weight of the mast and of the airplane. The airplane is mounted upon a universal swivel at the top of the mast so that it is free to rotate about any one or all of its three principal axes. Air forces similar to those of flight are produced by a fan within the wind tunnel which is provided with a variable speed motor for driving the fan. The speed of the motor is controlled by a throttle so arranged relative to a stick and rudder bar that the combination suggests the cockpit of an airplane. The stick and rudder bar are linked to the ailerons, elevators and rudder of the model airplane by a plurality of bell crank levers and fish line control cables which extend through the mast to the airplane and thus it is possible to operate the control surfaces by the rudder bar and stick just as in a full size airplane. Wind resistance on the controls is simulated by a rubber washer on the stick and by a rubber block behind the rudder bar. The counter weights offset only the excess weight of the plane and mast so that the plane lands in the ordinary manner when the blast is throttled. Thus, the ship is able to take off and land, pitch, turn, and bank after the manner of a plane flying in a sufficiently high wind to keep it over a given point.

Referring specifically to the drawings, we have shown a model airplane 11 mounted on a mast 12 in such relation to a wind tunnel 13 that blasts of air from the wind tunnel cause the airplane to simulate flight. Blasts of air may be created by a propeller fan 14 located within the wind tunnel 13 driven by a variable speed electric motor 15. The speed of the motor may be controlled by a variable resistance switch 16, interposed in the power supply line 17, or by any other convenient means. The variable speed control may be connected by a link 18 with a lever 19 designed to create the impression of a throttle for an engine of the airplane. Located conveniently to and in the usual proper relation to the lever 19 are a control "stick" 21 and a rudder bar 22. Connections extend from the stick 21 and the rudder bar 22 through the mast 12 to the model airplane, but are covered from view by the floor covering 23 and by the casing 23ª, which supports the table 24 upon which the airplane appears to land and through which the mast 12 extends. The casing 23ª, as well as the control stick 21 and the rudder bar 22, the table 24 and the airplane 11, are supported by sills 25 which are in turn supported for convenient movement by casters such as those shown at 26 and 27. The wind tunnel 13 is also mounted upon sills 28 which are supported by casters such as those shown at 29 and 31. Between the casters 27 and 29, a connecting means 32 may be provided for positioning the airplane 11 and its support in proper relation to the wind tunnel 13. A chair 33 or other suitable seat may be provided for the operator of the device.

Figure 2:
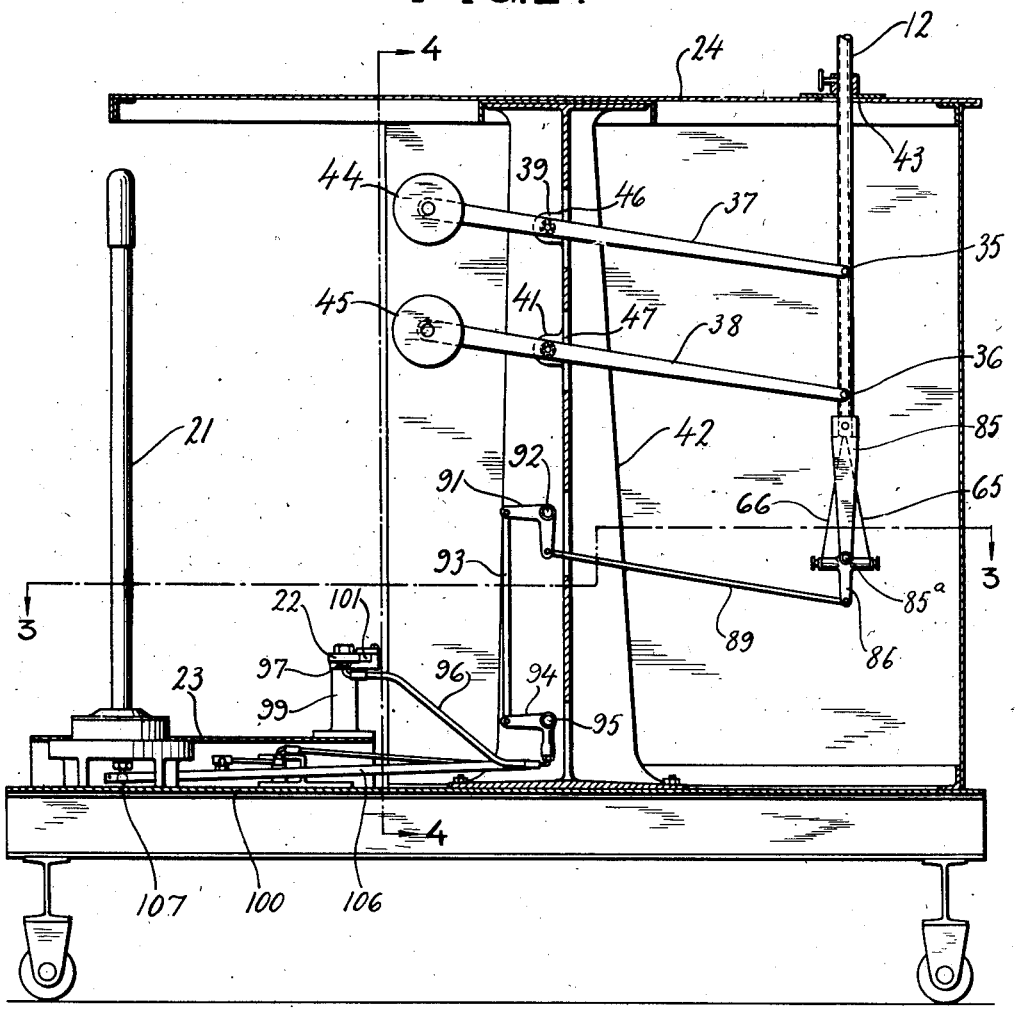
Fig. 2 is a view in vertical section of part of the device shown in Fig. 1, looking in the same direction as the view of Fig. 1.

As stated above, the airplane 11 is mounted on the mast 12 and means are provided for allowing the mast and the airplane to rise and fall substantially vertically. Referring particularly to Fig. 2 of the drawings, it may be seen that the mast 12 is pivotally supported as at 35 and 36 by the parallel levers 37 and 38 which are themselves pivoted respectively on ears 39 and 41, mounted upon the post 42. The pivot points on the ears 39 and 41 are placed in a vertical line, so that by reason of the parallel link connection the mast 12 is maintained continuously vertical. A slit 43 in the table 24 allows the necessary fore and aft motion of the mast 12 incident upon the pivotal movement of the levers 37 and 38. At the opposite ends of the levers 37 and 38 from the pivots 35 and 36 are weights 44 and 45, respectively, provided for the purpose of counter balancing the excess weight of the mast 12 and the model 11. Openings 46 and 47 are provided through the post 42 for the passage of the levers 35 and 36. It may thus be seen that a slight lift on the airplane which may be produced by the air blast will cause it and the mast to be raised substantially vertically, but that in the absence of the lift the airplane will remain on the table.

Figure 5:
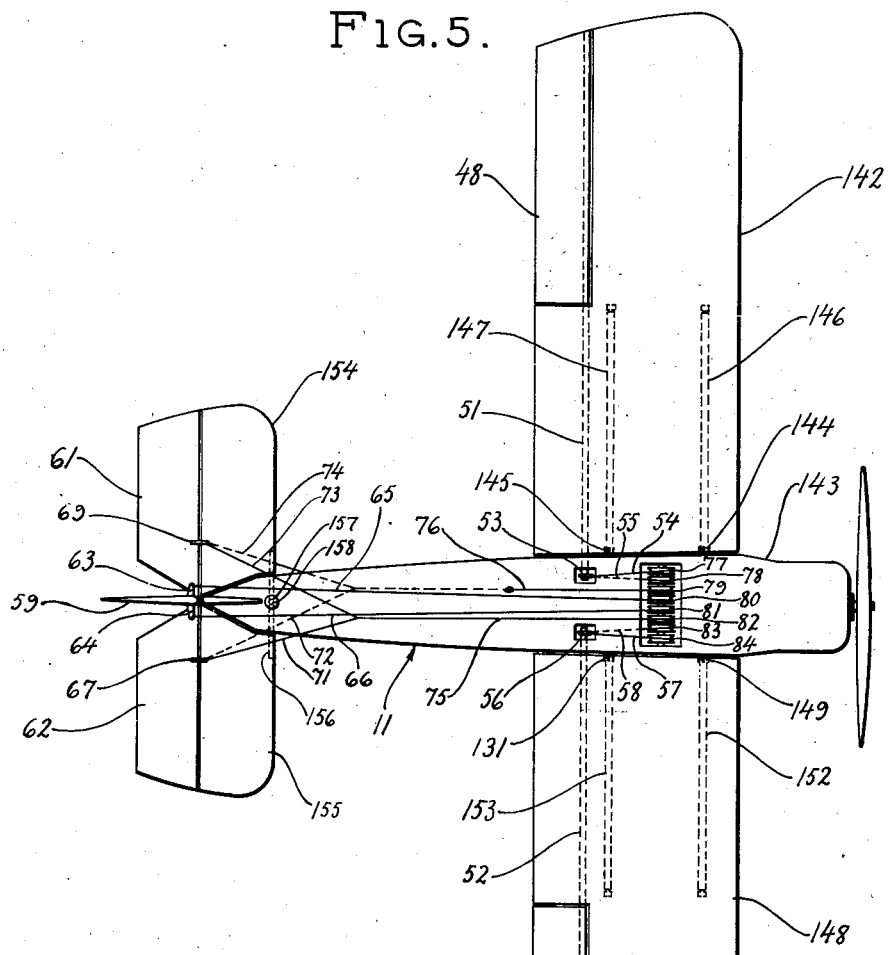
Fig. 5 is an enlarged plan view of the model airplane shown in Fig. 1.

We provide standard control surfaces for controlling the movement of the airplane about its three principal axes. Referring particularly to Fig. 5 of the drawings, it may be seen that there are ailerons 48 and 49 carried by rotatable tubes 51 and 52, respectively. The tube 51 carries at its inner end a pair of horns such as that shown at 53, one horn extending above and one horn extending below the tube. To the upper of these horns is connected the fish line control cable 54 and to the lower, the fish line control cable 55. Similarly, the inner end of the tube 52 carries a similar pair of horns such as that shown at 56. To the upper of these is connected the fish line control cable 57 and to the lower the fish line control cable 58. Provided at the rear of the fuselage of the airplane are the ordinary tail surfaces which include a rudder 59 and elevators 61 and 62. The rudder 59 is provided with a pair of horns 63 and 64 extending outwardly therefrom and to which are connected, respectively, the control cables 65 and 66. The elevator 62 has a pair of horns 67 and 68 and the elevator 61 has a pair of similar horns, one of which is shown at 69. A control cable 71 is connected to the horn 67 and a control cable 72 is connected to the horn 68. A control cable 73 is connected to the horn 69 and a control cable 74 is connected to the horn underneath the elevator 61 corresponding to the horn 69. The control cables 71 and 73 merge into a single cable 75 and the control cables 72 and 74 are both joined to a single cable 76. The control cables 54, 55, 76, 65, 66, 75, 58 and 57 pass respectively over pulleys 77, 78, 79, 80, 81, 82, 83 and 84 and thence downward through the hollow mast 12 to be connected through devices later to be described, to the stick 21 and the rudder bar 22. Thus, it is possible through operation of said stick and rudder bar to control the standard or conventional control surfaces of the model airplane just as they are usually controlled in a full size airplane. Inasmuch as the airplane is mounted for substantially free up and down movement and substantially free movement about its three principal axes, and inasmuch as the air blast from the propeller 14 is arranged to blow directly on the airplane to cause the aerofoils thereof to exert "lift", actual flight may be simulated to a remarkable degree.

Figure 3:
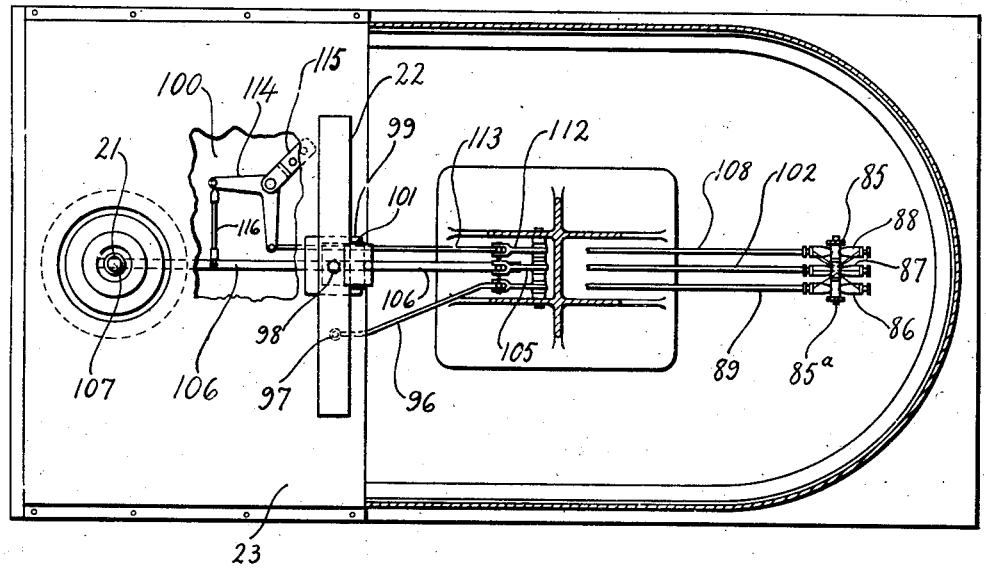
Fig. 3 is a view in horizontal section taken on the line 3—3 of Fig. 2.
Figure 4:
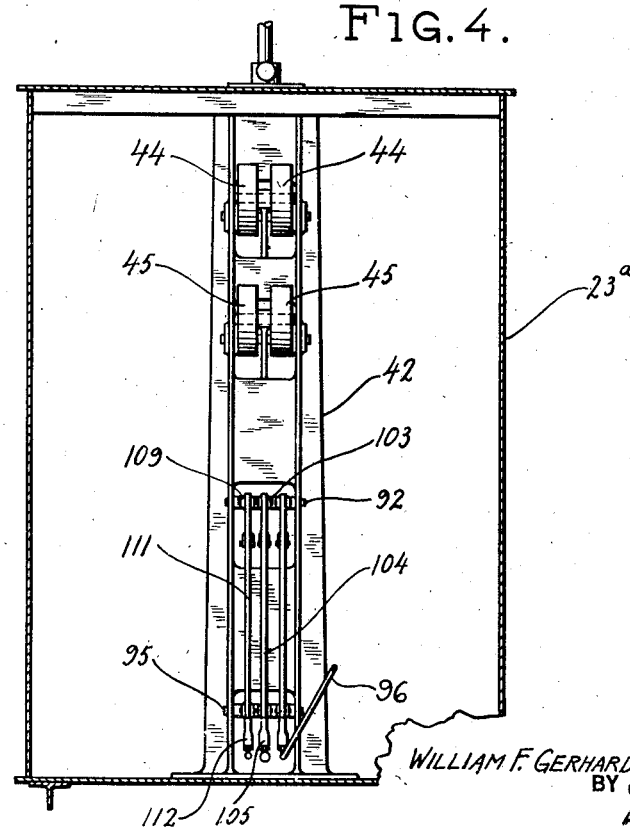
Fig. 4 is a view in vertical section taken on the line 4—4 of Fig. 2.

Means are provided for operating the various controls of the model airplane by the full size control stick and rudder bar. The cables, as previously described, pass from the pulleys 77 to 84, inclusive, downward through the hollow mast 12 and at the lower ends thereof are connected to double bell crank levers. The bell crank levers are in turn connected through various links and levers to the control stick and rudder bar. For this purpose, the mast 12 carries at its lower end a yoke bracket 85 (see Figs. 2 and 3) which in turn supports a horizontal bearing shaft 85ᵃ upon which are pivoted the double bell crank levers 86, 87 and 88.

We will describe first the connections to the rudder bar by which the rudder is controlled. Adjustably connected to the left hand end of the double bell crank lever 86 is the cable 66 and adjustably connected to the right hand end thereof is the cable 65, said cables being connected as above described to the rudder. The lower arm of said bell crank lever 86 is connected by a substantially horizontal link 89 with a bell crank lever 91 pivoted on a horizontal bearing shaft 92. A second link 93 extends downward and connects the opposite end of the bell crank lever 91 with one end of another bell crank lever 94 pivoted on a horizontal bearing shaft 95. The horizontal bearing shafts 92 and 95 are so positioned that the pivots thereof are exactly in line with and vertically beneath the centers of the pivots 39 and 41. The opposite end of the bell crank lever 94 is connected to a curved link 96 which is in turn pivotally connected as at 97 to the rudder bar 22 at a point at one side of the pivot thereof. As shown clearly in Fig. 3 the rudder bar 22 is pivoted at 98 in a support 99 which may be secured to the cover plate 23 or if desired to the base plate 100 of the structure. A rectangular rubber block 101 is placed back of the rudder bar 22 between it and its support and normally tends to maintain the rudder bar in a neutral position. It may thus be seen that the rudder is also normally held in neutral position. However, when the left hand side of the rudder bar is pushed forward it will pull the link 96, thus rocking the bell crank 94 clockwise as seen in Fig. 2 and through the link 93, the bell crank 91 and the link 89 similarly rocking the double bell crank 86. This pulls on the cable 65 and releases the cable 66. As may be seen from Fig. 5, this moves the rudder 59 to the left looking forward and guides the airplane to the left. In a similar manner pushing the right hand side of the rudder bar reverses the movement of the bell cranks, levers, cables and rudder and turns the airplane to the right.

The controls for the elevators are somewhat similarly connected. As described above the cables 75 and 76 are connected to the elevators. The cable 75 is adjustably connected to the right hand end of the double bell crank lever 87 and the cable 76 is adjustably connected to the left hand end thereof. The lower end of said double bell crank lever 87 is connected by a link 102 with a bell crank lever 103 pivoted also on the horizontal shaft 92. Another link 104 extends from the other end of the bell crank lever 103 to a bell crank lever 105 pivoted on the horizontal shaft 95. A link 106 connects the lower end of the bell crank lever 105 with a ball and socket joint 107 at the lower end of the control stick 21. As may be seen clearly in Fig. 6, the control stick 21 is pivoted on ball bearings 110 for a limited amount of universal movement. Movement of the control stick in a fore and aft direction, causes a rocking of the bell crank lever 87, through the links 106, 104 and 102 and the bell cranks 105 and 103 and thus causes movement of the cables 75 and 76. Thus, when the stick 21 is moved forward, it pulls the link 106 and rotates the double bell crank 87 (clockwise in Fig. 2). This pulls the cable 75 and through branch cables 71 and 73, raises the elevators 61 and 62. Movement of the stick backward similarly lowers the elevators through the pull on cable 76 and branch cables 72 and 74.

The ailerons are also connected to the stick 21. The control cables 54 and 58 which are connected respectively to the upper arm of the tube 51 and the lower arm of the tube 52 are both adjustably connected to the left hand end of the double bell crank lever 88. The control cables 55 and 57 which are connected respectively to the lower arm of the tube 51 and the upper arm of the tube 52 are both adjustably connected to the right hand end of the double bell crank lever 88. The lower arm of the bell crank lever 88 is connected by a link 108 with a bell crank lever 109 pivoted on the horizontal shaft 92. The other end of the bell crank lever 109 is connected by a link 111 with a bell crank lever 112 pivoted on the horizontal shaft 95, and the other end of the bell crank lever 112 is connected by a link 113 with a bell crank lever 114 pivoted about a vertical axis on a bracket 115. The opposite end of the bell crank lever 114 is connected by a laterally extending adjustable link 116 with the link 106 so that movement of the stick 21 to the right or to the left causes movement of the cables 54, 55, 57 and 58 and of the tubes 51 and 52 and thus causes movement of the ailerons 48 and 49. Movement of the stick 21 to the left looking forward, causes a movement to the right of the ball and socket joint 107 and of the link 106. This causes a pull on the link 116, a rocking of the bell crank 114 (counter-clockwise in Fig. 3) a push on the link 113, a rocking of the bell crank 112 (counter-clockwise if it were seen in Fig. 2) and a similar movement of the double bell crank lever 88. This imparts a pull on the control cables 54 and 58 and consequently raises the aileron 48 and lowers the aileron 49. This movement of the ailerons tends to depress the left wing of the airplane and to raise the right wing. Similarly movement of the stick 21 to the right tends to raise the left wing and to depress the right wing.

As stated above, the airplane is mounted for universal movement at the top of the mast 12 so that it may rotate about any one of its three principal axes. The details of this universal mounting may be seen by reference to Figs. 7 and 8. Mounted adjacent to the top of the mast 12 for rotation about the vertical axis of said mast is a sleeve 117, ball bearings 118 on said shaft 12 being provided to aid in the ease of rotation. Outside of the sleeve 117 is a sleeve 119 mounted for rotation about a horizontal axis transverse of the airplane, the ball bearings 121 being provided at the bearings for the purpose of decreasing frictional resistance. Mounted outside of the sleeve 119 is another sleeve 122 which is mounted for rotation about a horizontal axis longitudinal of the airplane, the pivoting movement being aided by the ball bearings 123. The sleeve 122 carries longitudinally extending plates 124 and 124ª which may be fastened to the lower floor of the fuselage or by screws passing through a plurality of holes such as that shown at 125. Thus, it may be seen that the airplane 11 is substantially free to move in any direction about its mounting at the top of the mast 12, and is free to move vertically with the mast.

Independent means are provided for preventing movement of the airplane about any one of its three principal axes or for preventing movement of the airplane in a vertical direction. An ear 127 (Figs. 7 and 8) having a hole 126 is made integral with the sleeve 122 and an ear 128 having an aligned hole is made integral with the sleeve 119. Thus, the insertion of a locking pin 126ª (Fig. 1) through the hole 126 and through the hole in the ear 128 prevents the relative movement of the sleeves 119 and 122 and therefore prevents rolling of the airplane. A thumb screw 131 (see Fig. 1) may be screwed into the sleeve 117 and may be positioned to contact with a bearing on the mast 12 and thus prevent movement of the sleeve 117 about the mast 12 and prevent yawing. A hole 132 in an ear 133, integral with the sleeve 119 is adapted to receive a pin which may enter a similar hole in the sleeve 117 and the pin may thus prevent relative movement between the sleeves 119 and 117 and prevent pitching of the airplane. A collar 134 is secured to the mast 12 by means of a lock screw 135 and carries an upstanding lug 136 adapted to contact with a pair of spaced shoulders on the sleeve 117. By adjustment of the collar 134 the amount of yaw of the airplane may be limited by the limit of contacts of the shoulders of the sleeve 117 with the lug 136. A collar 137 (see Fig. 1) secured to the table 24 for movement only in a fore and aft direction carries a lock screw 138 by means of which the mast 12 may be secured against vertical movement when desired and the airplane held at a constant elevation and prevented from climbing or gliding.

It is to be understood that by detaching the control cables, and removing the screws from the holes 125, an airplane having different characteristics may be substituted. In such a case it may be necessary to vary the weights 44 and 45 in order to compensate for differences in the weight of the substituted airplane.

Figure 6:
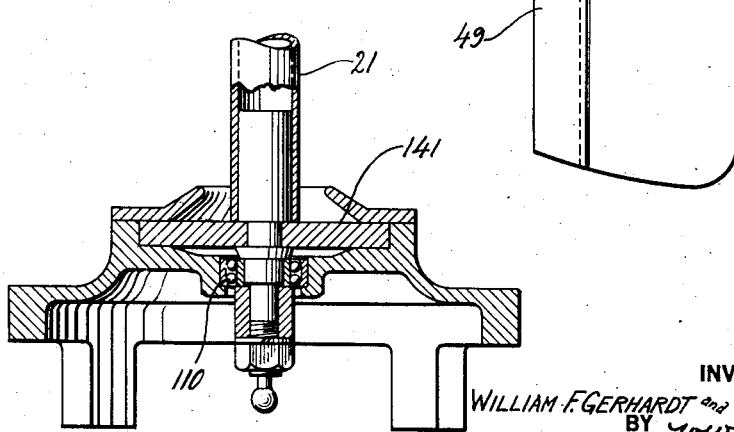
Fig. 6 is an enlarged sectional view of the mounting of the control "stick"

Means are provided for simulating wind resistance on the control surfaces and for maintaining the controls in their normal central positions. As previously pointed out, a rubber block 101 is positioned back of the rudder bar 22 and tends to return it to its neutral position when moved therefrom. This rubber block also provides resistance against the movement of the rudder bar similar to that which would be experienced by a pilot in controlling a full size airplane. Similar means are provided in connection with the stick 21. Referring to Fig. 6 it may be seen that a rubber disk 141 is positioned to surround the lower extension of the stick 21 above the pivot 110. This rubber disk yieldingly opposes movement of the stick 21 from its normal neutral position and tends to return it to the neutral position after the impulse moving it away has been removed.

Provision is made for adjusting the dihedral of the wings of the model airplane. To this end the wing 142 is secured to the fuselage 143 by means of hinges 144 and 145 (see Fig. 5) and is supported by adjustable braces 146 and 147. Similarly, the wing 148 is hinged at 149 and 151 and is supported by adjustable braces 152 and 153.

Means are provided for adjusting the horizontal stabilizers of the model airplane. The horizontal stabilizers 154 and 155 may be pivoted at their rear edge and joined by a rod 156 (see Fig. 5). The rod 156 has an eyelet 157 and a screw 158 may be secured to the rear part of the fuselage and screwed into the eyelet 157 for the purpose of raising or lowering the front edge of the stabilizers and thus varying the angle of incidence thereof.

As previously suggested, the various control cables are adjustably fastened to the bell crank levers 86, 87 and 88. To secure this adjustability each end of each of the levers 86, 87 and 88 may be provided with a clamp screw which may be loosened and the control cables adjusted to the desired point. Thereafter, the clamp screws may be tightened to maintain the control cables in any desired adjustment.

The wind tunnel 13 is constructed especially for use with our improved instruction model airplane. In addition to the electric motor 15 and the propeller fan 14 previously mentioned, there is included within the tunnel a cone 161 having its apex end closed and pointing away from the propeller fan 14 and its larger end open. The cone is positioned in the exact center of the wind tunnel and causes the blast of air to flow without turbulence out of the tunnel past the airplane at its position when in normal flight, i. e., after it has been raised from the table but before it reaches the upper limit of the travel of the mast 12. Three baffle plates, such as those indicated at 162 and 163 are positioned within the wind tunnel and placed at angles of 120 degrees from each other for the purpose of aiding in straightening the air flow through the tunnel. Honeycombs constructed of pipes, such as that shown at 164, are positioned at the outer end of the wind tunnel for similar purposes.

The operation of the apparatus shown in illustration of our invention may vary according to the use for which the apparatus is to be put. For instance, the device may be operated for preliminary flight instruction. For such use, the student may be seated upon the seat 33 and instructed in the use of the various controls. He may then place his feet upon the rudder bar 22, grasp the stick 21 in one hand and place the other hand upon the throttle 19. Pushing the throttle 19 forward operates the variable speed switch 16 and causes the electric motor 15 to drive the propeller fan 14 which forces a stream of air through the wind tunnel and against the model airplane. Pushing the stick 21 forward causes a pull upon the link 106, a turning of the bell crank lever 105 in a clockwise direction (if it were seen in Fig. 2) and a consequent turning of the bell crank lever 87 in a similar direction through the links 104 and 102 and the bell crank lever 103. This turning movement of the bell crank lever 87 causes a pull upon the cables 76, 72 and 74 and a consequent lowering of the elevators 61 and 62. The force of the air stream acting upon the elevators causes the airplane to assume a substantially level position and the lift of the air stream upon the wings 142 and 148 causes the airplane 11 and the mast 12 to rise substantially vertically pivoting with the links 37 and 38 about the pivots 39 and 41, the counter weights 44 and 45 balancing the excess weight of the airplane and mast. Should the airplane tip to one side, the student may move the control stick 21 in the opposite direction and through the link 116, the bell crank lever 114, the link 113, the bell crank 112, the link 111, the bell crank lever 109, the link 108, the double bell crank 88, the cables 54, 55, 57 and 58, and the tubes 51 and 52 operate the ailerons 48 and 49 to bring the airplane back to level position. Exactly as in a full size airplane, movement of the stick 21 fore and aft may be combined with lateral movement thereof and thus any desired combination of settings of both the elevators and ailerons obtained by movement of the stick only. Similarly, should he desire to turn the airplane in either direction, he may, through the rudder bar 22, the link 96, the bell crank 94, the link 93, the bell crank 91, the link 89, the double bell crank 86, and the cables 65 and 66 operate the rudder 59 to turn the airplane in the desired direction.

Actually it would probably be more advantageous to instruct the student in the operation of only one control at a time. For instance, he might be instructed only in the operation of the elevators, in which case the airplane would be locked against movement about its longitudinal axis and about its vertical axis by means of the locking pin 126a and the thumb screw 131. Similarly, he might be instructed to operate the ailerons only, in which case the airplane might be locked against vertical movement by the screw 138, against yawing by the thumb screw 131 and against pitching by a pin inserted in the hole 132. Later, he might be instructed to operate the rudder alone. Following this he could operate various controls in combination, as for example the elevators and ailerons. Later he should operate the elevators, ailerons and rudder all in combination.

The model can be also used in ground school instruction for the purpose of demonstrating directional stability and control, longitudinal stability and control, and lateral stability and control. In the demonstration of stability the model may be prepared and the propeller operated to cause an air stream to lift the model. The model might be then displaced from the level position and the restoring moment demonstrated. In this manner, both static stability and dynamic stability may be demonstrated. In the demonstration of lateral stability if the model is set up with maximum dihedral and clamped against yawing, it may be noted that upon lateral displacement, (roll) there will be no restoring moment, thus disproving the "horizontal equivalent" theory of the effect of dihedral on lateral stability. However, when the model is set up with maximum dihedral and is free to yaw, after lateral displacement the airplane will be automatically restored to its level position.

Of course demonstration of the use of the controls for the purpose of directing the movements of the airplane, the peculiar behavior of various types of airplanes, of the manner in which the wings of airplanes exert lift, of the behavior of an airplane in a stall and a great many other airplane attributes may be also admirably demonstrated.

It is to be understood that the above described embodiment of the invention is for the purpose of illustration only and various changes may be made therein without departing from the spirit and scope of the invention.

We claim as our invention:

1. An aeronautical device comprising a support, a model of an aerial vehicle mounted for movement about its longitudinal and transverse axes relatively to said support, said model having an elevator and ailerons, and means comprising a full sized control device operable at a distance from said model for moving said ailerons and said elevator.

2. An aeronautical device comprising a support, a model of an aerial vehicle mounted for movement about its vertical axis relatively to said support, said model having a rudder, and means operable at a distance from said model comprising a full sized control device located at a distance from said aerial vehicle for moving said rudder.

3. An aeronautical device comprising a model of an aerial vehicle, said model having a control surface, a movable support upon which said model is mounted, a control cable connected to said control surface and carried through said support, and a control connected to the opposite end of said control cable.

4. In an aeronautical device, a support comprising a substantially vertical mast, a model of an aerial vehicle universally pivoted at an end of said mast for limited movement with respect thereto, and full sized control devices located at a distance from said model for moving said model about its several axes of rotation relatively to said support.

5. In an aeronautical device, means for creating a stream of air, a freely movable model of an aerial vehicle positioned within said stream of air and having control surfaces, and means operable at a distance from the model for actuating the control surfaces to control the movements of said model.

6. In an aeronautical device, means for creating a stream of air, a model of an aerial vehicle freely movable about its longitudinal axis positioned within said stream of air and having ailerons for controlling the lateral balance thereof, and means operable at a distance from said aerial vehicle for actuating said ailerons.

7. In an aeronautical device, means for creating a blast of air, a model of an aerial vehicle freely movable about its vertical axis positioned within said blast of air and having a rudder for controlling its movement about said vertical axis, and means operable at a distance from said aerial vehicle for actuating the rudder.

8. An aeronautical device comprising means for creating a blast of air, a model of an aerial vehicle freely movable about its horizontal transverse axis positioned within said blast of air and having elevators for controlling its movement about said horizontal transverse axis, and means operable at a distance from said aerial vehicle for actuating the elevators.

9. In an aeronautical device, means for creating a blast of air, an aerial vehicle movable about its longitudinal, transverse and vertical axes positioned within said blast of air and having control surfaces for controlling its movement about said longitudinal, vertical and transverse axes, and means operable at a distance from said aerial vehicle for actuating the control surfaces.

10. An aeronautical device comprising means for creating a blast of air, a universally mounted model of an aerial vehicle positioned within said blast of air and having control surfaces for controlling the movements of said model about its universal mounting, and means operable at a distance from said aerial vehicle for actuating the control surfaces, said last mentioned means comprising full sized aerial vehicle controls.

11. An aeronautical device comprising means for creating a stream of air, a freely movable model of an aerial vehicle positioned within said stream of air, means including full sized control devices operable at a distance from said aerial vehicle for controlling the movement thereof, and means operable at a distance from said aerial vehicle and from said stream of air creating means for controlling the speed of the stream of air flowing past said aerial vehicle, said last mentioned means including a full sized control throttle.

12. In an aeronautical device, a wind tunnel for creating a stream of air, a freely movable model of an aerial vehicle positioned so as to be within said stream of air when created and having a control surface for controlling the movements thereof, and means at a distance from said aerial vehicle for actuating said control surface.

13. In an aeronautical device, a wind tunnel, a propeller fan within said wind tunnel for creating a stream of air, an electric motor for driving said propeller fan, a freely movable model of an aerial vehicle positioned adjacent to said wind tunnel and within said air stream and having control surfaces for controlling the movements of said aerial vehicle, and means at a distance from said aerial vehicle for actuating said control surfaces.

14. An aeronautical device including a vertically movable support, a model of an aerial vehicle having a universal mounting upon said support and having control surfaces, regulable means for producing a stream of air into which said model is arranged to head and for causing said model and its support to move vertically, and means operable to actuate said control surfaces to control the movements of said model relatively to said support.

15. An aeronautical device comprising a model of an aerial vehicle, a platform arranged to simulate a landing field for the said aerial vehicle and upon which said model may rest, a mounting for said model vertically slidable in relation to said platform, and regulable means for producing a stream of air into which stream the model is arranged substantially to head and for thus causing the model to rise vertically from the platform, whereby the model may take off from the platform and may land thereon.

16. An aeronautical device comprising a model of an aerial vehicle, a platform arranged to simulate a landing field therefor and upon which said model may rest, a universal mounting for said model, a mast arranged to slide substantially vertically in relation to said platform and having the mounting secured to the upper end thereof, a plurality of parallel levers pivotally secured to said mast for supporting said mast, pivotal supports for said levers, weights positioned at the opposite ends of said levers for counter balancing the excess weight of the model and the mast, and regulable means for producing a stream of air into which stream the model is arranged substantially to head and for thus causing the model to rise vertically from the platform whereby the model may take off from the platform and land thereon.

17. In an aeronautical device, means for creating a stream of air, a model of an aerial vehicle positioned within said stream of air and having a control surface, means for moving the control surface of said aerial vehicle comprising a full sized control stick, and means for simulating upon said stick the normal resistant effect thereon of wind acting on a full sized control surface.

18. In an aeronautical device, means for creating a stream of air, a model of an aerial vehicle positioned within said stream of air and having a control surface, means for moving the control surface of said model comprising a full sized rudder bar and means for simulating upon said rudder bar the normal resistant effect thereon of wind acting on full sized control sufaces.

19. An aeronautical device comprising means for creating a stream of air, a model of an aerial vehicle mounted in said stream of air, a movable support upon which said model is mounted, a substantially stationary support, a lever pivotally mounted upon said stationary support, means for pivotally connecting said lever to said movable support, and a weight secured to an opposite part of said lever sufficient to counterbalance part but not all of the weight of the model and movable support.

20. An aeronautical device comprising a model of an aerial vehicle, a support therefor, means for mounting the model on said support for vertical movement relative thereto, a weight for counterbalancing part but not all of the weight of the model, and means for connecting the model and the weight so that a relatively slight upward force exerted upon the model causes it to rise.

21. An aeronautical device comprising a model of an aerial vehicle, a mast upon which said aerial vehicle is mounted, a substantially stationary support, a pair of levers pivotally mounted upon said support at points vertically aligned with each other, means for pivotally connecting one end of each of said levers to said mast, and weights secured to the opposite ends of said levers sufficient to counter balance nearly but not quite all of the weight of the model and the mast.

WILLIAM F. GERHARDT.
CLARENCE A. BROCK.